United States Patent
Middleton

[15] 3,694,048
[45] Sept. 26, 1972

[54] MOVABLE COMPARTMENT
[72] Inventor: Forest L. Middleton, Middleville, Mich.
[73] Assignee: Lescoa, Inc., Grand Rapids, Mich.
[22] Filed: Sept. 28, 1970
[21] Appl. No.: 75,978

[52] U.S. Cl.................312/246, 308/3.6, 312/341 R
[51] Int. Cl. ...............................................A47b 88/14
[58] Field of Search ........312/246, 341, 345; 308/3.6

[56] References Cited
UNITED STATES PATENTS

| | | | |
|---|---|---|---|
| 3,275,396 | 9/1966 | Hillson et al................ | 312/246 |
| 3,109,688 | 11/1963 | Middleton.................. | 312/246 |

*Primary Examiner*—Bobby R. Gay
*Assistant Examiner*—Darrell Marquette
*Attorney*—Price, Heneveld, Huizenga & Cooper

[57] ABSTRACT

A movable compartment having a pair of mounting members spaced laterally from each other, each one having a pair of tracks at its sides, a pair of supports associated with the mounting members, each support having a pair of tracks at its sides, a box secured at each of its sides to one of the supports, ball bearings positioned between the mounting members and the supports lying in the tracks therein and means retaining the ball bearings in that position whereby the box is movable with respect to the mounting members through the ball bearings rolling in the tracks in the mounting members and the supports.

3 Claims, 5 Drawing Figures

PATENTED SEP 26 1972
3,694,048
SHEET 1 OF 2
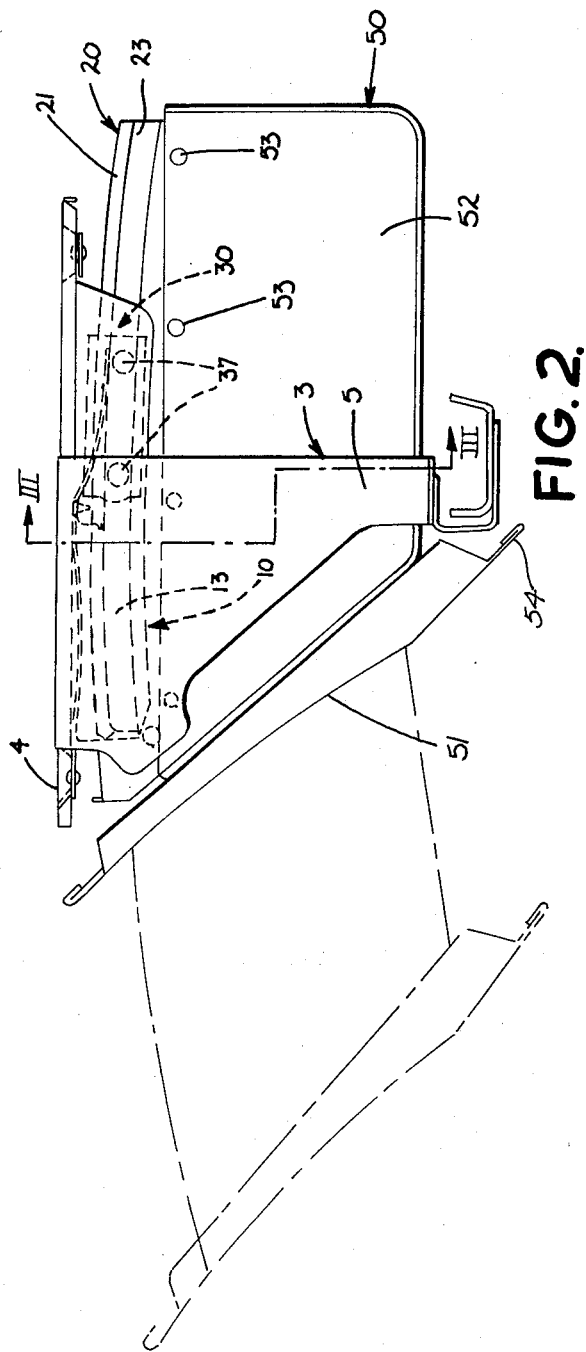
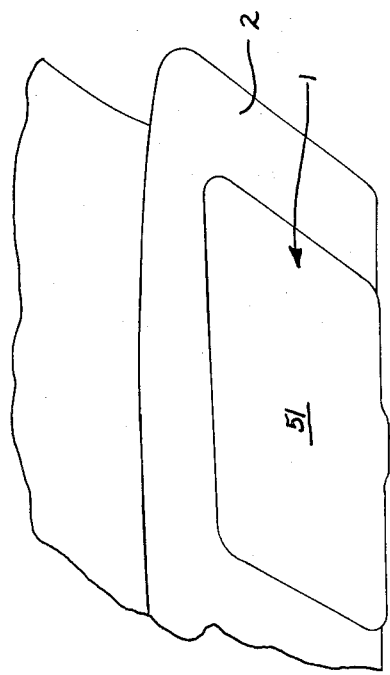
INVENTOR
FOREST L. MIDDLETON
BY Price, Heneveld
Huizenga & Cooper
ATTORNEYS

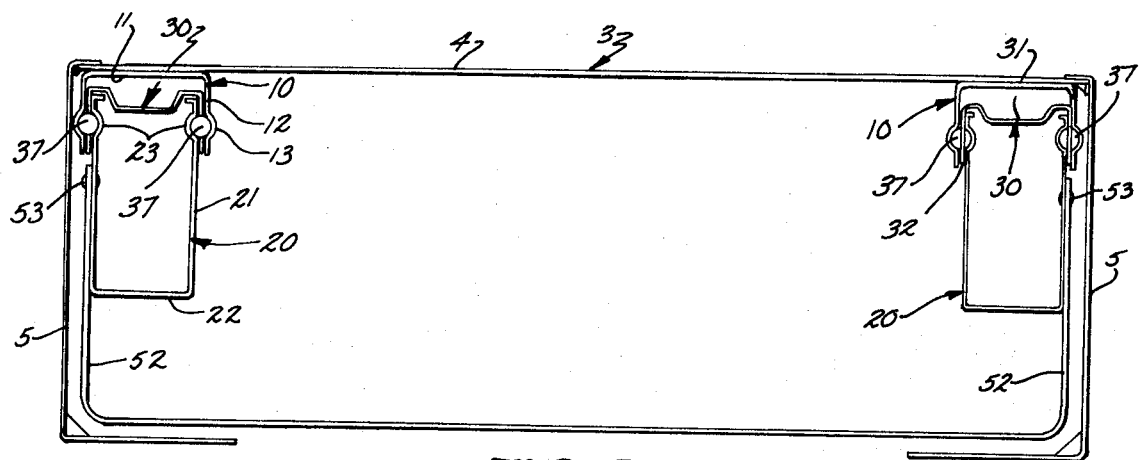
FIG. 3.
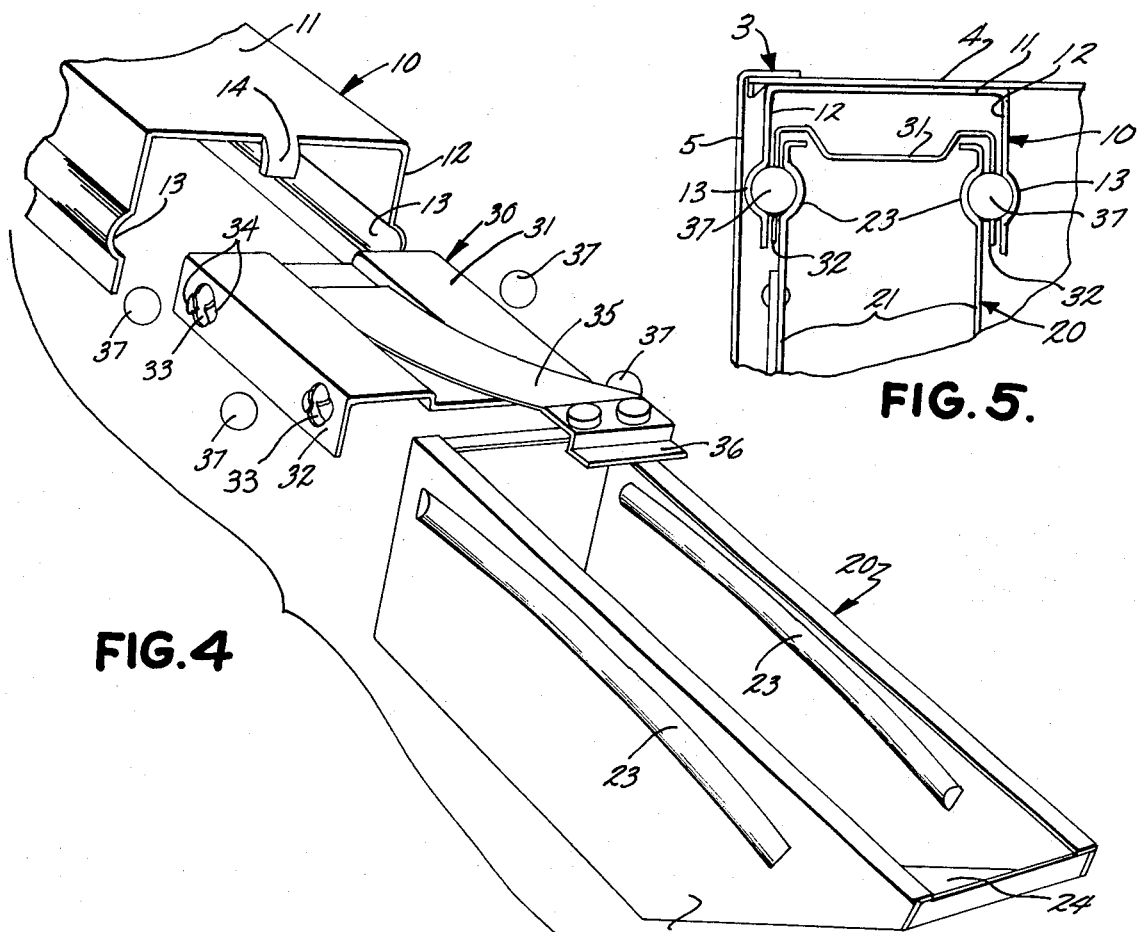
FIG. 4
FIG. 5.
INVENTOR
FOREST L. MIDDLETON
ATTORNEYS

MOVABLE COMPARTMENT

BACKGROUND OF THE INVENTION

This invention relates to movable compartments. More particularly, this invention relates to a movable compartment adapted to be mounted in the interior of an automobile or the like.

Conventionally, glove boxes in the dashboards of automobiles comprise nothing more than a fixed compartment having a front door hinged to open and expose the interior thereof. However, such glove boxes can be often very impractical because items are merely piled therein and when looking for any particular item one cannot readily see or have access to the rear of the compartment. For this reason, ash trays in certain automobiles have recently been made larger to include small compartments for placing important items such as change, keys, etc. therein. Such large ash trays move into and out of the dash and therefore the compartments are readily accessible and the items can be readily seen and picked out. Larger ash trays of this type have been made possible and practical in recent years through the utilization of ash trays employing ball bearings in their movement into and out of the dash of the type shown in my U.S. Pat. No. 3,109,688 issued Nov. 5, 1963 to the same assignee herein. However, even though the structure disclosed therein made it possible to have larger ash trays than conventional structures known theretofore, the structure disclosed therein still could not be incorporated into a glove box structure with complete satisfaction.

OBJECTS AND BRIEF DESCRIPTION OF THE INVENTION

It is therefore an object of this invention to provide a movable compartment utilizing many of the teachings of U.S. Pat. No. 3,109,688 in association with a larger compartment such as a glove box or the like.

Another object of this invention is the provision of such a movable compartment especially adapted for use in automobiles or the like wherein the compartment can be moved from the dash to provide visual and physical accessibility to the interior thereof.

Another object of this invention is the provision of such a movable compartment which, even though of a larger size, does not require expensive glide structures, rather, uniquely utilizes rolling bearing means in its operation, thereby essentially eliminating friction and cocking of the component parts and providing exceptional smoothness in operation.

These objects are accomplished basically by the provision of a pair of mounting members spaced laterally from one another, each of the mounting members having a pair of tracks at its sides. A pair of supports are associated with the mounting members, each of the supports having a pair of tracks at its sides. A compartment box is secured at each of its sides to one of the supports. Ball bearings are positioned between the mounting members and the supports, the ball bearings lying in the tracks therein. Means retain the ball bearings in this position whereby the box is movable with respect to the mounting members through the ball bearings rolling in the tracks in the mounting members and the supports.

DESCRIPTION OF THE PREFERRED EMBODIMENT

This invention will be readily understood by those skilled in the relevent arts from a reading of the following specification and a study of the accompanying drawings wherein:

FIG. 1 is a perspective view of a glove box mounted in the dashboard of an automobile;

FIG. 2 is a side view of the glove box, the movable compartment thereof shown in open position in phantom lines, certain parts of the structure being shown in dotted lines to better disclose the invention;

FIG. 3 is a cross-sectional view taken along the plane III—III of FIG. 2;

FIG. 4 is an exploded, perspective view of the mounting structure and support at one end of the movable compartment; and FIG. 5 is an enlarged, cross-sectional view showing the mounting member and support at one side of the movable compartment. Referring to FIG. 1, the reference numeral 1 designates a movable compartment in accordance with the teachings of this invention, shown mounted in the dash 2 of an automobile. It should be understood that within the broadest aspects, the invention relates to movable compartments in general. The movable compartment 1 includes a pair of mounting members 10, a pair of supports 20, carriage elements 30 interconnecting the mounting members and the supports and a compartment box 50 secured to the supports 20 (FIGS. 3, 4 and 5).

Each mounting member 10 includes a bight portion 11 and a pair of depending flanges 12 having elongated beads 13 formed therein. The mounting members 10 are spaced laterally from one another and in the embodiments shown are interconnected to the frame 3. The frame 3 includes an upper panel 4, the bight portions 11 of the mounting members 10 being secured to the underside edges thereof, side panels 5 lying adjacent the mounting members 10. A depending tab 14 extends from the front of each mounting member 10, the purpose of which will explained hereinafter.

Each support 20 includes a pair of vertical flanges 21 joined by a lower bight portion 22, beads 23 being formed in the vertical flanges 21. The compartment box 50 is secured to the supports 20. The front panel 51 of the box 50 is secured to the fronts 24 of the supports 20 and the sides 52 of the box 50 are secured to the outer sides of the supports 20 by suitable means such as the rivets 53.

Each support 20 is adapted to fit within a corresponding mounting member 10. Carriage elements 30 are positioned therebetween, each carriage element being of generally U-shape and including a bight portion 31 together with depending sidewalls 32. Openings 33 are formed in the sidewalls 32, tabs 34 being formed adjacent the openings 33. Spring 35 is secured to the top of bight portion 31, spring 35 terminating in a stop 36, the purpose of which will be explained hereinafter. Ball bearings 37 are adapted to fit within the openings 33.

In assembly, the compartment box 50 is secured to the supports 20 as described. A carriage element 30 is then positioned over each of the supports 20, the ball bearings 37 lying within the beads 23 in the sidewalls of the supports. The tabs 34 prevent the ball bearings 37 from escaping from the beads 23, although permitting their exposure from the openings 33. It should be noted that the carriage elements 30 may be constructed of a material sufficiently expandable to allow insertion thereof over the supports 20. The compartment box 50 secured to the supports 20 having carriage elements 30 mounted thereon is then inserted into the mounting members 10 secured to the frame 3. The ball bearings 37 are exposed through the openings 33 and slide into the beads 13 in the flanges 12 of the mounting members 10. When the carriage elements 30 are being inserted into the mounting members 10, the spring 35 are depressed and snap behind the tabs 14 on the mounting members 10. This secures the compartment box within the frame 3.

It will now be seen that by merely grasping the formed handle 54 on the bottom of the front 51 of the compartment box 50, the box may be moved inwardly and outwardly from the dash of the automobile (or whatever other enclosure in which the movable compartment might be mounted). Inward movement is of course limited by the dash of the automobile. Outward movement is limited by the stops 36 on the springs 35 engaging the depending tabs 14 on the mounting members 10. The ball bearings 37 move within the tracks 23 and 13, thus facilitating movement of the box in and out of the dash. This provides maximum smoothness in operation, the possibilities of friction and cocking being essentially eliminated, thereby eliminating problems of operation during movement. This is achieved by the unique utilization of the mounting members in cooperation with the supports, the ball bearings being positioned therein for relative movement of the mounting members with respect to the supports, and thereby allowing movement of the compartment box secured to the supports. Expensive glide structures have been eliminated and the structure is relatively simple, allowing it to be fabricated at a cost less than that of conventional movable compartments achieving such a degree of movement. When such a movable compartment is used for example as a glove box in an automobile, the usefulness of the glove box is greatly increased because of the accessibility both visually and physically to the compartment by its users.

While a preferred embodiment of this invention has been provided in detail, it will be readily apparent to those skilled in the art that other embodiments may be conceived and fabricated without departing from the spirit and scope of this invention. Such other embodiments are to be deemed as included within the scope of the appended claims unless these claims by their language expressly state otherwise.

The embodiments of the invention in which an exclusive property or privilege is claimed are defined as follows:

1. A movable compartment adapted to be mounted in the interior of an automobile or the like, comprising: a pair of mounting members spaced laterally from one another, each of said mounting members having a pair of tracks at its sides; a pair of supports associated with said mounting members, each of said supports having a pair of tracks at its sides; a box secured at each of its sides to one of said supports; ball bearings positioned between said mounting members and said supports, said ball bearings lying in said tracks in said mounting members and said supports; means retaining said ball bearings in said position comprising a carriage element of generally U-shape positioned between each of said mounting members and said supports, each of said elements having tabs formed in depending side walls for retaining said ball bearings but exposing said ball bearings to said tracks in said mounting members and said supports whereby said box is movable with respect to said mounting members through said ball bearings rolling in said tracks in said mounting members and said supports.

2. A movable compartment as defined in claim 1 wherein said mounting members are mounted to a connecting frame member and each of said mounting members including a pair of vertical flanges having said tracks lying horizontally therein and each of said supports including a pair of vertical flanges having said tracks lying horizontally therein.

3. A movable compartment as defined in claim 2, said tracks in said mounting members and said supports comprising elongated beads formed therein.

* * * * *